(12) United States Patent
Hsieh et al.

(10) Patent No.: US 7,911,783 B2
(45) Date of Patent: Mar. 22, 2011

(54) PORTABLE COMPUTER WITH PROJECTING FUNCTION

(75) Inventors: Chih-Ho Hsieh, Taipei (TW); Su-Ching Hsu, Taipei (TW); Jing-Hung Cheng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 58 days.

(21) Appl. No.: 12/407,127

(22) Filed: Mar. 19, 2009

(65) Prior Publication Data

US 2009/0290298 A1 Nov. 26, 2009

(30) Foreign Application Priority Data

May 20, 2008 (TW) .............................. 97118490 A

(51) Int. Cl.
*G06F 1/16* (2006.01)
(52) U.S. Cl. ................... 361/679.55; 361/679.27; 345/7
(58) Field of Classification Search ............ 361/679.55, 361/679.27; 345/7, 52, 178
See application file for complete search history.

(56) References Cited

U.S. PATENT DOCUMENTS

| | | | | |
|---|---|---|---|---|
| 5,483,250 A * | 1/1996 | Herrick | ............................ | 345/32 |
| 5,510,806 A * | 4/1996 | Busch | ...................... | 361/679.55 |
| 5,719,799 A * | 2/1998 | Isashi | ............................ | 708/105 |
| 5,748,441 A * | 5/1998 | Loritz et al. | ............. | 361/679.27 |
| 5,847,748 A * | 12/1998 | Laughlin | ....................... | 725/105 |
| 5,880,928 A * | 3/1999 | Ma | ............................ | 361/679.27 |
| 5,898,600 A * | 4/1999 | Isashi | ............................ | 708/105 |
| 6,262,884 B1 * | 7/2001 | Hwang et al. | ............. | 361/679.04 |
| 6,437,974 B1 * | 8/2002 | Liu | ............................ | 361/679.27 |
| 6,504,706 B2 * | 1/2003 | Stewart | ..................... | 361/679.04 |
| 6,525,750 B1 * | 2/2003 | Knox | ............................ | 345/30 |
| 6,650,532 B2 * | 11/2003 | Shin | ........................ | 361/679.27 |
| 6,806,850 B2 * | 10/2004 | Chen | ................................ | 345/7 |
| 6,930,669 B2 * | 8/2005 | Weiner et al. | ................. | 345/156 |
| 7,059,732 B2 * | 6/2006 | Oross et al. | .................... | 353/119 |
| 7,061,472 B1 * | 6/2006 | Schweizer et al. | ........... | 345/168 |
| 7,083,289 B2 * | 8/2006 | Oross et al. | .................... | 353/119 |
| 7,110,052 B1 * | 9/2006 | Faris et al. | ........................ | 349/5 |
| 7,641,348 B2 * | 1/2010 | Yin et al. | ...................... | 353/119 |
| 2002/0024611 A1 * | 2/2002 | Watanabe et al. | ............. | 348/373 |
| 2002/0085342 A1 * | 7/2002 | Chen et al. | ..................... | 361/683 |
| 2005/0110961 A1 | 5/2005 | Oross et al. | | |
| 2008/0136973 A1 * | 6/2008 | Park | ........................... | 348/744 |
| 2009/0257176 A1 * | 10/2009 | Yang | ........................ | 361/679.01 |
| 2009/0322967 A1 * | 12/2009 | Liou et al. | ..................... | 348/744 |
| 2010/0039763 A1 * | 2/2010 | Hsu et al. | ................. | 361/679.26 |

FOREIGN PATENT DOCUMENTS

| | | |
|---|---|---|
| CN | 1831794 | 9/2006 |
| CN | 1881388 | 12/2006 |
| CN | 2916726 | 6/2007 |

OTHER PUBLICATIONS

English abstract of CN1831794.
English language translation of abstract of CN 1881388 (published Dec. 20, 2006).
English language translation of abstract of CN 2916726 (published Jun. 27, 2007).

* cited by examiner

*Primary Examiner* — Lisa Lea-Edmonds

(57) ABSTRACT

A portable computer with a projecting function includes a main body, a display module, a pivot, and a projection module. The display module is connected to the main body via the pivot and capable of rotating relative to the main body. The projection module is disposed on the pivot for projecting the information of the main body. The portable computer is, for example, a laptop computer, or a tablet computer.

17 Claims, 3 Drawing Sheets

PORTABLE COMPUTER WITH PROJECTING FUNCTION

BACKGROUND OF THE INVENTION

This application claims the benefit of Taiwan application Serial No. 97118490, filed May 20, 2008, the subject matter of which is incorporated herein by reference.

FIELD OF THE INVENTION

The invention relates to a portable computer and, more particularly, to a portable computer with a projecting function.

DESCRIPTION OF THE RELATED ART

The popularity of desktop or portable computers enables users to enjoy the convenience from computers no matter they are at home, work, or outside. The computer not only provides many functions such as processing documents, accessing the Internet, drawing, and audio and video entertainment, but also can be used with other electronic devices.

When used in a business or academic field, a portable computer is often used with a projecting device for enlarging information to enable the attendants to get the content of the information synchronously at a conference or a lecture. However, many transmission cables need to be used to connect a computer to a projecting device. For example, the cable is used between the computer and the projecting device, and the cable is used between the projecting device and the power supply. This results in inconvenient operation.

BRIEF SUMMARY OF THE INVENTION

The invention provides a portable computer with a projecting function. The potable computer includes a main body, a display module, a pivot, and a projection module. The display module is connected to the main body via the pivot and capable of rotating relative to the main body. The projection module is disposed on the pivot for projecting the information of the main body.

The invention provides another portable computer with a projecting function. The potable computer includes a main body, a display module, a pivot, and a projection module. The display module is connected to the main body via the pivot and capable of rotating relative to the main body, and it includes a display surface and a marginal surface adjacent to the display surface. The projection module, for projecting the information of the main body, is disposed on the marginal surface of the display module.

These and other features, aspects and advantages of the present invention will become better understood with regard to the following description, appended claims, and accompanying drawings.

DETAILED DESCRIPTION OF THE EMBODIMENTS

Figure 1:
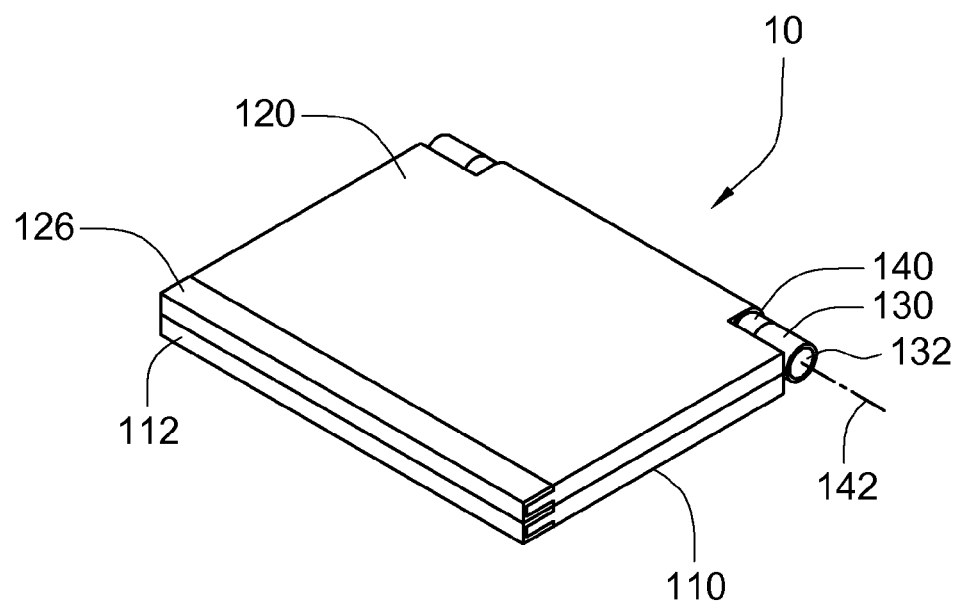
FIG. 1 is a schematic diagram showing a portable computer with a projecting function according to a preferred embodiment of the present invention.

FIG. 1 is a schematic diagram showing a portable computer with a projecting function according to a preferred embodiment of the present invention. The portable computer 10 includes a main body 110, a display module 120, a projection module 130, and a pivot 140, wherein the system of the portable computer 10 is installed in the main body 110. The display module 120 is connected with the main body 110 via the pivot 140 and may rotate relative to the main body 110. The projection module 130 is provided for projecting the information on a display surface 122.

The portable computer 10 in the embodiment may be a laptop computer or a tablet computer, while the display module 120 may be a liquid crystal display module. In addition, an inputting device (not shown) may be disposed on the main body 110 and between the main body 110 and the display module 120, and it may be a keyboard or a touch panel for users to operate the portable computer 10.

The pivot 140 may be, for example, a multi section fixing pivot to fix the display module 120 at different angles after the display module 120 rotates relative to the main body 110, and it can bear the weight of the portable computer 10 at other configuration states.

Preferably, the projection module 130 corresponds to the rotating axis 142 of the pivot 140. The projection module 130 includes a projection lens 132 located on the extension direction of rotating axis 142 of the pivot 140, and the projection lens 132 may be disposed, for example, flush with the marginal surface 124 of the display module 120 to keep the integrity of the device. In the embodiment, the projection module 130 may be a liquid crystal on silicon (LCOS) projection module or a digital light processing (DLP) projection module.

As shown in FIG. 1, the main body 110 and the display module 120 are set with anti-skid members 112 and 126 on their outside margins, respectively. The anti-skid member 112 and 126 are provided for preventing the portable computer 10 from skidding when the portable computer 10 is disposed horizontally or vertically. The anti-skid members 112 and 126 completely cover the margins of the main body 110 and the display module 120 respectively or only cover part of the side surfaces. The anti-skid members 112 and 126 are made from anti-skid material such as plastics, rubber, or leather, or a patterned grain may be made at the marginal surface of the device body 110 and the display module 120 to increase the friction force between the main body 110 or the display module 120 and other members to ensure the portable computer 10 stable at different configuration states.

Figure 2:
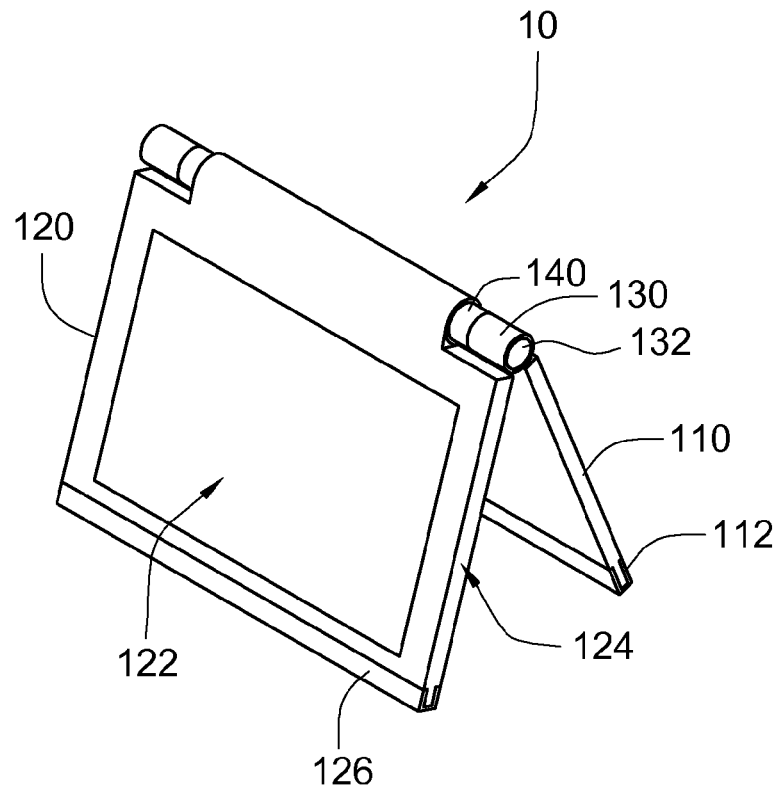
FIG. 2 is a schematic diagram showing the display module in FIG. 1 with a rotation angle more than 180 degrees.

After the display module 120 rotate an angle relative to the main body 110, the display module 120 and the main body 110 may be disposed to form an inverted V-shape structure, and therefore the portable computer 10 stands vertically to allow users to use the projection module 130 on the pivot 140 conveniently. When the rotating angle of the display module 120 is less than 180 degrees, the display surface 122 of the display module 120 is disposed inwards. In addition, as shown in FIG. 2, when the rotating angle of the display module 120 is larger than 180 degrees, the display surface 122 of the display module 120 is disposed outwards. During projecting, the projection module 130 faces a screen (not shown), and it projects the information on the display surface 122 to the screen. Since the display surface 122 is disposed outwards, users can directly watch the information on the display surface 122 besides the screen when operating the portable computer 10.

Figure 3:
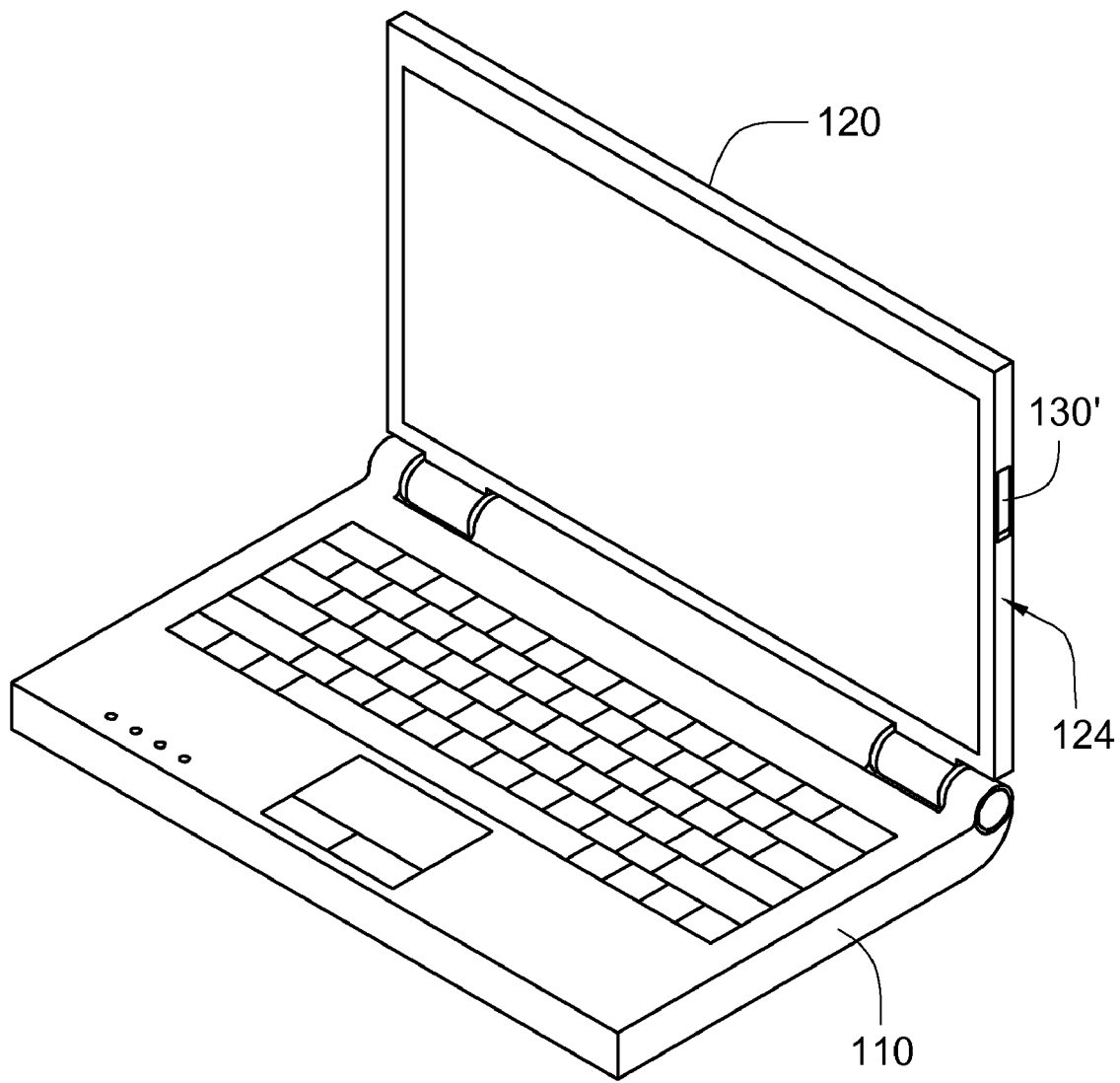
FIG. 3 is a schematic diagram showing a projection module disposed in the display module.
Figure 4:
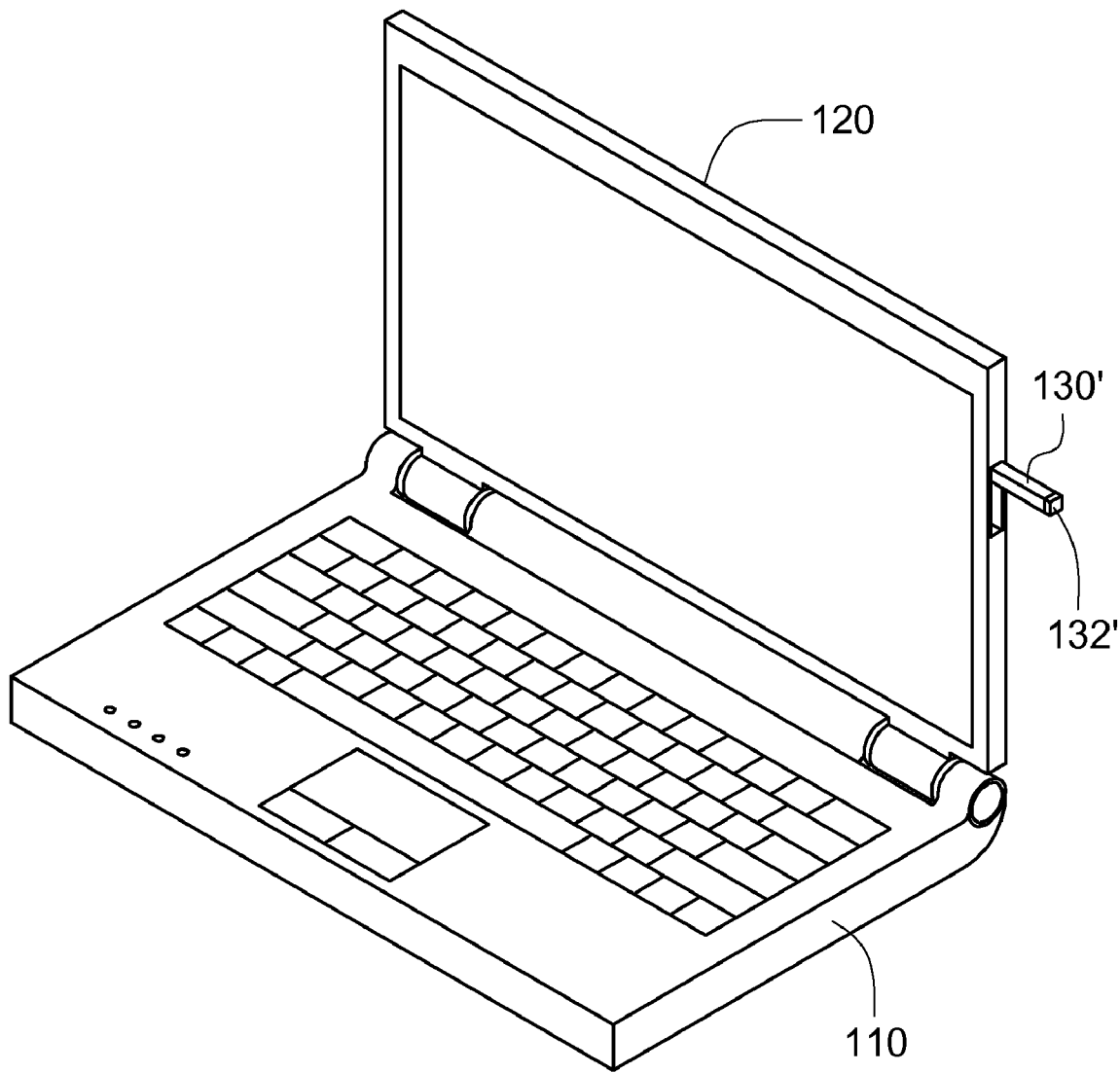
FIG. 4 is a schematic diagram showing the projection module in FIG. 3 in operation.

FIG. 3 is a schematic diagram showing a projection module disposed in the display module; FIG. 4 is a schematic diagram showing the projection module in FIG. 3 in operation. As shown in FIG. 3, the projection module 130' directly disposed in the display module 120 may be, for example, a movable device to be movably disposed on the marginal surface 124 of the display module 120. When the projection module 130' needs to be operated, it may be moved out of or ejected from the marginal surface 124 of the display module 120. As shown in FIG. 4, a projection lens 132' of the projection module 130' is disposed outwards to face the screen.

According to the embodiments of the invention, a portable computer with a projecting function includes a built-in projection module and has a projection or power point function directly without an external projecting device. Therefore, the conventional problem of needing many connecting transmission cables is settled. The projection module is disposed along the edge of the display module, or preferably disposed on the pivot between the display module and the main body. Via the pivot between the display module and the main body, the display module and the main body can form an inverted V-shape structure to enable the display surface of the display module to be set inwards or outwards. In addition, anti-skid members may be disposed on the external marginal surface of the portable computer to increase the friction force between the portable computer and other members to ensure the portable computer stable at different configuration states, and they are made of anti-skid material such as plastics, rubber, or leather etc., and may be a patterned grain.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A portable computer with a projecting function, comprising:
    a main body storing information;
    a pivot connected with the main body;
    a display module connected to the main body via the pivot to be capable of rotating relative to the main body; and
    a projection module electrically connected with the main body and disposed on the pivot, wherein the information is outputted from the main body to the projection module and projected by the projection module.

2. The portable computer according to claim 1, wherein the projection module comprises a projection lens located in an extension direction of a rotating axis of the pivot.

3. The portable computer according to claim 1, wherein the display module is capable of rotating an angle relative to the main body to allow the display module and the main body to form an inverted V-shape structure.

4. The portable computer according to claim 3, wherein the angle is less than 180 degrees to enable a display surface of the display module to be set inwards.

5. The portable computer according to claim 3, wherein the angle is greater than 180 degrees to enable a display surface of the display module to be set outwards.

6. The portable computer according to claim 1, wherein the pivot is a multi section fixing pivot for fixing the display module at different angles after the display module rotates relative to the main body.

7. The portable computer according to claim 1, wherein each of the main body and the display module has an anti-skid member for avoiding skidding.

8. The portable computer according to claim 7, wherein the anti-skid members are opposite to the pivot.

9. The portable computer according to claim 7, wherein the anti-skid members have a patterned grain.

10. The portable computer according to claim 1, wherein the portable computer is a laptop computer or a tablet computer.

11. The portable computer according to claim 1, wherein the projection module is a liquid crystal on silicon (LCOS) projection module or a digital light processing (DLP) projection module.

12. A portable computer with a projecting function, comprising:
    a main body storing information;
    a pivot connected with the main body;
    a display module connected to the main body via the pivot to be capable of rotating relative to the main body, wherein the display module includes a display surface and a marginal surface which are near each other; and
    a projection module, electrically connected with the main body and disposed on the marginal surface of the display module, wherein the information is outputted from the main body to the projection module and projected by the projection module.

13. The portable computer according to claim 12, wherein the main body comprises an anti-skid member for avoiding skidding.

14. The portable computer according to claim 13, wherein the anti-skid member has a patterned grain.

15. The portable computer according to claim 12, wherein the portable computer is a laptop computer or a tablet computer.

16. The portable computer according to claim 12, wherein the projection module is a liquid crystal on silicon (LCOS) projection module or a digital light processing projection module.

17. The portable computer according to claim 12, wherein the projection module comprises a projection lens located at one end of the projection module and the projection lens is movably ejected from the marginal surface of the display module for projecting the information.

* * * * *